United States Patent [19]

Hashimoto et al.

[11] 4,378,150
[45] Mar. 29, 1983

[54] ELECTROMAGNETICALLY DRIVEN SHUTTER

[75] Inventors: Teiji Hashimoto, Kawasaki; Michio Senuma, Tokyo, both of Japan

[73] Assignee: Canon Kabushiki Kaisha, Tokyo, Japan

[21] Appl. No.: 280,339

[22] Filed: Jul. 6, 1981

[30] Foreign Application Priority Data

Jul. 7, 1980 [JP] Japan .................................. 55-92887

[51] Int. Cl.³ .............................................. G03B 9/40
[52] U.S. Cl. ...................................... 354/234; 354/246
[58] Field of Search ...................... 354/266, 245–249, 354/241–244, 268, 234

[56] References Cited

U.S. PATENT DOCUMENTS

| | | | |
|---|---|---|---|
| 4,034,390 | 7/1977 | Urano et al. | 354/268 X |
| 4,225,221 | 9/1980 | Saito et al. | 354/266 X |
| 4,236,796 | 12/1980 | Hayashi et al. | 354/246 X |

Primary Examiner—John Gonzales
Attorney, Agent, or Firm—Toren, McGeady and Stanger

[57] ABSTRACT

In an electromagnetically driven focal plane shutter of the type having a trailing screen which moves irrespective as to whether a leading screen is moving, there are provided a detecting member arranged to detect movement of the leading screen and an inhibiting means which inhibits the trailing screen from moving when movement of the leading screen is not detected.

8 Claims, 2 Drawing Figures

ELECTROMAGNETICALLY DRIVEN SHUTTER

BACKGROUND OF THE INVENTION

1. Field of the Invention:

This invention relates to an electromagnetically controlled focal plane shutter of the type having a trailing screen freely movable irrespective of whether a leading screen moves.

2. Description of the Prior Art:

Focal plane shutters in general and particularly those of the type arranged to electrically control the start of movement of leading and trailing screens by means of electromagnets or the like have a problem in that the trailing screen is operated alone when the leading screen has failed to move due to, for example, malfunctioning of a leading screen controlling electromagnet or the like. Thus, a shutter operating sound is produced every time a photographing operation is performed even when such malfunction occurs. The photographer, in such a case, tends to remain unaware of the problem and might waste film and miss a valuable photographing opportunity.

SUMMARY OF THE INVENTION

It is an object of the invention to provide an electromagnetically driven shutter which enables photography without fail.

It is another object of the invention to provide an electromagnetically driven shutter which is capable of displaying occurrence of an erroneous operation or the like of the shutter.

In accordance with the invention, a detecting means which detects movement of a leading screen is provided in a shutter arranged to have movement of the leading and trailing screens thereof controlled by electromagnetic forces. The shutter according to the invention is further provided with an inhibiting means which is arranged to inhibit the trailing screen from moving when movement of the leading screen has not been detected by the detecting means. Therefore, if the leading screen should fail to move due to some malfunction despite a shutter release signal, the trailing shutter screen will not be driven and the film will not be fed to enable the photographer to know that malfunctioning of the shutter has occurred.

Further, in accordance with the invention, a lever is provided for detection of movement of the leading screen; and either one end of the detection lever or a member interlocked with the lever is arranged to be able to enter a travelling locus of another member which is interlocked with the trailing screen. The arrangement is such that, when the leading screen fails to move, the trailing screen comes to abut on the lever or the member interlocked therewith in the path of its travel so that the trailing screen can be stopped from travelling further.

In another feature of the invention there is provided a switch which operates when the trailing screen comes close to the end of its travel so as to cause a light emitting diode to flicker or to serve for control over the photographing sequence of processes to be carried out within the camera.

These and further objects and features of the invention will become apparent from the following detailed description of embodiments thereof taken in connection with the accompanying drawings.

DETAILED DESCRIPTION OF THE PREFERRED EMBODIMENTS

Figure 1:
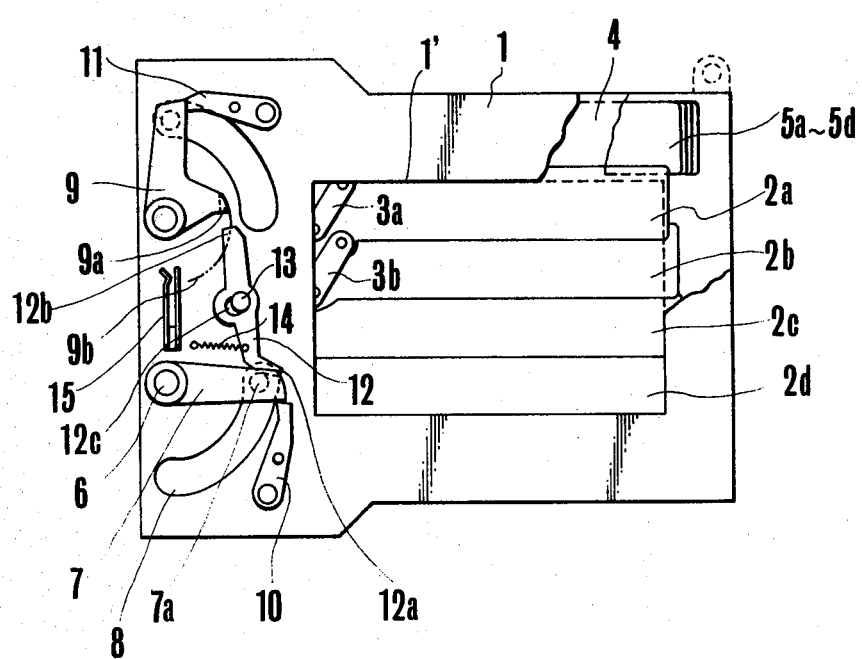
FIG. 1 is a plan view showing the essential parts of a focal plane shutter as an embodiment of the invention.

An embodiment of the invention which is shown in FIG. 1 includes a base plate 1 of the focal plane shutter; an opening 1' provided in the base plate 1; a plurality of light shielding thin plates 2a to 2d which jointly form a leading screen unit as first shutter member; and parallel link members 3a and 3b which pivotally support the light shielding thin plates 2a–2d in such a way as to permit them to rotate.

A part of each of the parallel link members 3a and 3b is pivotally carried by a shaft which is not shown but is provided on the base plate 1. When the parallel link member 3b is caused to rotate, the other parallel link member 3a moves together with it to cause in turn the light shielding thin plates 2a–2d to be moved approximately in parallel with each other in such a way as to open and close the above stated opening 1' provided in the base plate 1.

The shutter is also provided with a plurality of light shielding thin plates 5a to 5d which form a trailing screen unit as second shutter member. These thin plates are also arranged to be driven by parallel link members (not shown) in the same manner as the leading screen unit. Between the leading and trailing screen units is provided a partition plate 4. A leading screen driving lever 7 is fiftted on a shaft 6 and is connected to the parallel link member 3b by a pin 7a disposed at the fore end of the driving lever 7. The pin 7a is arranged to be guided through a slot 8 provided in the base plate 1. The trailing screen unit 5a–5d is arranged to be driven by a trailing screen driving lever 9 which is arranged in the same manner as the leading screen driving lever 7. Each of the trailing screen driving lever 9 and the leading screen driving lever 7 has an urging force to move it clockwise as viewed on the drawing exerted thereon by a spring which is not shown.

The leading and trailing screens are restrained in their start positions by clamping claws 10 and 11. The locking thus effected by the leading screen clamping claw 10 is arranged to be removable by an electromagnet which is not shown but is employed as first electromagnetic means while the locking effected by the trailing screen clamping claw 11 is arranged to be removable by another electromagnet which is also not shown but is employed as second electromagnetic means. An exposure action can be performed with the leading and trailing screens released from these clamping claws 10 and 11 by the forces of the electromagnets one after another. Now, in accordance with the invention, the shutter is provided with a detecting lever 12. The detecting lever has a sensing end 12a as detecting means. The lever 12 is fitted, through a slot 12c, on a shaft 13 provided on the base plate 1. Further, the detecting lever 12 is urged to rotate clockwise by a spring 14. There is also provided a pair of normally open contacts forming a switch 15 which is arranged to be turned on by one end 9a of the trailing screen driving lever 9 in the vicinity of the end of the travelling course of the lever 9. The embodiment of the invention arranged as described in the foregoing operates in the following manner:

In FIG. 1, the shutter is illustrated as in a charged state. Under this condition, when a shutter release signal causes the electromagnet which is not shown to operate to cause in turn the clamping claw 10 to move to the right as viewed on the illustration of FIG. 1, the front screen driving lever 7 is disengaged from the claw 10 and begins to rotate to the right as viewed on the illustration. Following this, the detecting lever 12 is caused by the spring 14 to rotate on the shaft 13 also to the right. Then, the other end 12b of the detecting lever which serves as inhibiting means moves out of the travelling locus of the protrudent end portion 9a of the trailing screen driving lever 9. After that, therefore, the trailing screen driving lever will not be inhibited from travelling when the clamping lever 11 is removed by the operation of the magnet or the like caused by a signal from an exposure control circuit which is not shown.

On the other hand, if, for example, the coil of the magnet is broken while the electrical signal is normally produced, the clamping claw would not be removed. In such a case, therefore, the leading screen is not allowed to travel. Since the detecting lever 12 is not able to rotate in such a case, one end 12b of the lever 12 does not allow the trailing screen driving lever 9 to rotate as the protrudent portion 9a of the lever 9 comes to abut on the end 12b of the detecting lever 12. Then, since the switch 15 is not turned on, the abnormal condition can be displayed after the shutter release signal is produced in some suitable manner, such as: A display means (not shown) arranged to flicker when the switch 15 remains off after the shutter release signal is produced; or provision of a sound producing member (not shown) arranged to sound a warning. Further, the switch 15 also may be so arranged as to bring the photographing sequence of processes to a stop thereafter.

In this particular embodiment of the invention, the center of rotation of the detecting lever 12 is in the form of a slot because of the following reason:

Generally, in a shutter of the type having a trailing screen freely movable irrespective of whether a leading screen has travelled, the path of one screen is arranged independently of that of the other. The two screens are disposed away from each other at a relatively long distance. Therefore, an overlap between the two screens can be increased to prevent light leakage by allowing beforehand the leading screen to move earlier than the trailing screen when the shutter is charged. With the shutter arranged in this manner, charging of the leading screen is completed earlier than the trailing screen. By the time when the trailing screen is charged, therefore, one end 7a of the leading screen driving lever 7 has already caused the detecting lever 12 to rotate to the left as viewed on the drawing to have one end 12b of the lever 12 moved into the locus 9b of the protrudent portion 9a of the trailing screen driving lever 9. In this instance, if the hole of the center of rotation of the detecting lever 12 is of about the same diameter as the shaft 13, the trailing screen driving lever 9 would be unable to return.

In the case of the present embodiment, therefore, this problem is solved by having the rotation center hole 12c of the detecting lever 12 formed into a slot shape to enable the lever 12 to escape from the locus 9a when the protrudent portion 9a of the lever 9 comes into contact with one end 12b.

Further, with the spring 14 arranged to exert its force on a point midway between the center hole 12c and the lower end 12a of the detecting lever 12, the spring 14 can be used both for the rotation of the lever 12 on the shaft 13 and for return rotation thereof on the end 12a.

Figure 2:
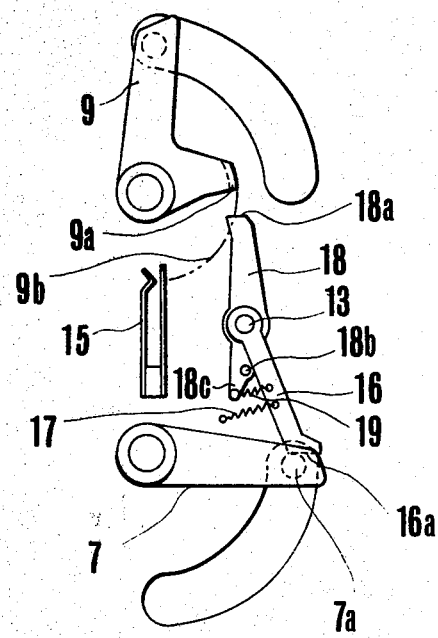
FIG. 2 is an illustration of a detecting member used for a shutter as another embodiment of the invention.

FIG. 2 shows the essential parts of a detecting member as another embodiment of the invention. In this case, the detecting lever 12 used in the preceding embodiment shown in FIG. 1 is divided into two members. One is for use as a trailing screen driving action preventing member while the other serves as a detecting member. The two members are linked by a spring arrangement.

In FIG. 2, the same parts as those shown in FIG. 1 are indicated by the same reference numerals. A detecting arm 16 is pivotally carried by a shaft 13. A spring 17 is arranged to have one end 16a of the detecting arm 16 follow a pin 7a of the leading screen driving lever. A stopper 18 is used for preventing the travel of the trailing screen and is pivotally carried by the shaft 13. One end 18a of the stopper 18 is arranged to enter the travelling locus of the trailing screen driving lever. Between the other end 18c of the stopper 18 and the above stated detecting arm 16 there is provided a spring 19 which is relatively week. A pin 18b which is arranged to be capable of abutting on a side face of the detecting arm 16 is provided on the stopper 18. The position of the arm 16 relative to the stopper 18 is defined with the pin 18b coming to abut on the side face of the detecting arm. When the leading screen driving lever 7 does not begin to travel as shown in FIG. 2 or when it has returned to its initial position after travelling, the stopper 18 has one end 18a thereof projecting into the travelling locus of the trailing screen driving lever.

Such being the structural arrangement of the shutter, when the trailing screen driving lever 9 tries to move to the right as viewed on the drawing under the condition as shown in FIG. 2, the movement is stopped by one end 18a of the stopper. Conversely, when the trailing screen driving lever 9 is going to turn to the left as viewed on the drawing for charging the shutter after completion of an exposure action, the stopper 18 readily turns to the right as viewed on the drawing against the urging force of the spring 19 and thus retires to the outside of the locus 9b of the lever 9.

As will be understood from the foregoing detailed description of the embodiments shown in FIGS. 1 and 2, the structural arrangement according to the invention is such that in a focal plane shutter of the type having a trailing screen freely movable irrespective of whether a leading acreen travels, the trailing screen is inhibited from travelling unless the leading screen travels as intended. This permits photography without failure and is advantageous particularly where the start of travel of the two shutter screens is controlled by means of electromagnets or the like.

Further, the provision of the switch which is arranged according to the invention to operate in the vicinity of the end of the travelling course of the trailing screen enables the photographer to know that failure of the leading screen or the trailing screen has occurred if either of them has failed to travel as intended.

In the first and second embodiments of the invention described in the foregoing, a mechanical lever is used as detecting means. It goes without saying, however, that the mechanical lever may be replaced with some other detecting means that is arranged to electrically or magnetically detect the travel of the leading screen as the first shutter member and to produce a signal accordingly. Further, it is also possible to use a third electromagnetic means for moving the inhibiting means.

The inhibiting means may be a two-input AND gate disposed in a trigger signal route of the second electromagnetic means. In such a case, the output of a known light measuring circuit may be connected to one of the two input terminals of the AND gate while the other input terminal may be arranged to receive a signal from the above stated detecting means.

While specific embodiments of the invention have been shown and described in detail to illustrate the application of the inventive principles, it will be understood that the invention may be embodied otherwise without departing from such principles.

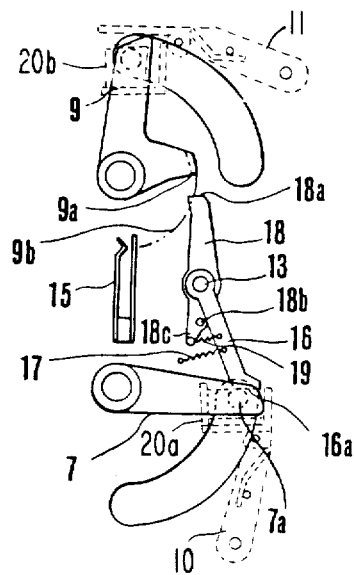

What is claimed is:

1. An electromagnetically controlled shutter member comprising:
    a base member having an opening defining a photographing optical path;
    a first shutter member adapted to be moved relative to said opening;
    first shutter driving means for driving said first shutter member;
    first electromagnetic means for controlling the travel of said first shutter member relative to said opening;
    a second shutter member arranged to move relative to said opening following a predetermined period of time after operation of said first shutter member, said second shutter member being capable of running independently of said first shutter member without regard to whether the first shutter member moves;
    second shutter driving means for driving said second shutter member;
    second electromagnetic means for controlling the travel of said second shutter member;
    detecting means for detecting actuation of said first shutter driving means to effect movement of said first shutter member; and
    prohibiting means arranged to prohibit movement of said second shutter driving means when movement of said first shutter driving means is not detected by said detecting means.

2. An electromagnetically driven shutter according to claim 1, wherein said first and second shutter members are disposed immediately before an image forming plane of the photographing optical path.

3. A shutter according to claim 1, wherein said first and second shutter driving means are arranged to be driven by spring means; and wherein said first and second electromagnetic means are arranged to release said spring means from a charged state prior to actuation of said shutter assembly.

4. A shutter according to claim 1, wherein said detecting means is arranged to move in accordance with travel of said first shutter driving means.

5. A shutter according to claim 4, wherein said inhibiting means is inserted in the travelling path of said second shutter member and is arranged to retire from said travelling path of the second shutter member in accordance with the displacement of said detecting means.

6. A shutter according to claim 1 wherein said inhibiting means and said detecting means jointly comprise a lever.

7. A shutter according to claim 6 wherein said lever has one end engaged with said first shutter driving means and another end engaged with said second driving means, whereby when said first shutter driving means does not operate said one end is engaged with said first shutter driving means while being urged by a spring, in such a manner that the other end assumes the position at which the movement of the second shutter driving means is inhibited, while when the first shutter driving means does operate, the other end, being urged by the spring, moves to a position at which the movement of the second shutter driving means is not inhibited.

8. A shutter according to claim 1 wherein there is provided second detecting means for detecting completion of the operation of said second shutter driving means which is arranged to operate in the vicinity of the end of the travelling course of said second shutter member.

* * * * *

UNITED STATES PATENT AND TRADEMARK OFFICE
CERTIFICATE OF CORRECTION

PATENT NO. : 4,378,150

DATED : March 29, 1983

INVENTOR(S) : Teiji Hashimoto et al

It is certified that error appears in the above-identified patent and that said Letters Patent is hereby corrected as shown below:

The Title page and the sheets of Drawings consisting of Figures 1 and 2 should be deleted to appear as per the attached sheets Column 2, line 49, delete "not shown but is";
          line 50, after "means" insert --20a--;
          line 52, delete "also not shown but is";
          line 53, after "means" insert --20b--;

Column 3, line 3, after "electromagnet" insert --20a--;
          delete "which is not shown";
          line 16, after "magnet" insert --20b--.

Signed and Sealed this

Second Day of October 1984

[SEAL]

Attest:

GERALD J. MOSSINGHOFF

Attesting Officer     Commissioner of Patents and Trademarks

United States Patent [19]
Hashimoto et al.

[11] 4,378,150
[45] Mar. 29, 1983

[54] ELECTROMAGNETICALLY DRIVEN SHUTTER

[75] Inventors: Teiji Hashimoto, Kawasaki; Michio Senuma, Tokyo, both of Japan

[73] Assignee: Canon Kabushiki Kaisha, Tokyo, Japan

[21] Appl. No.: 280,339

[22] Filed: Jul. 6, 1981

[30] Foreign Application Priority Data

Jul. 7, 1980 [JP] Japan ............... 55-92887

[51] Int. Cl.³ ............................................. G03B 9/40
[52] U.S. Cl. ............................. 354/234; 354/246
[58] Field of Search ............... 354/266, 245–249, 354/241–244, 268, 234

[56] References Cited

U.S. PATENT DOCUMENTS

| | | | |
|---|---|---|---|
| 4,034,390 | 7/1977 | Urano et al. | 354/268 X |
| 4,225,221 | 9/1980 | Saito et al. | 354/266 X |
| 4,236,796 | 12/1980 | Hayashi et al. | 354/246 X |

*Primary Examiner*—John Gonzales
*Attorney, Agent, or Firm*—Toren, McGeady and Stanger

[57] ABSTRACT

In an electromagnetically driven focal plane shutter of the type having a trailing screen which moves irrespective as to whether a leading screen is moving, there are provided a detecting member arranged to detect movement of the leading screen and an inhibiting means which inhibits the trailing screen from moving when movement of the leading screen is not detected.

8 Claims, 2 Drawing Figures

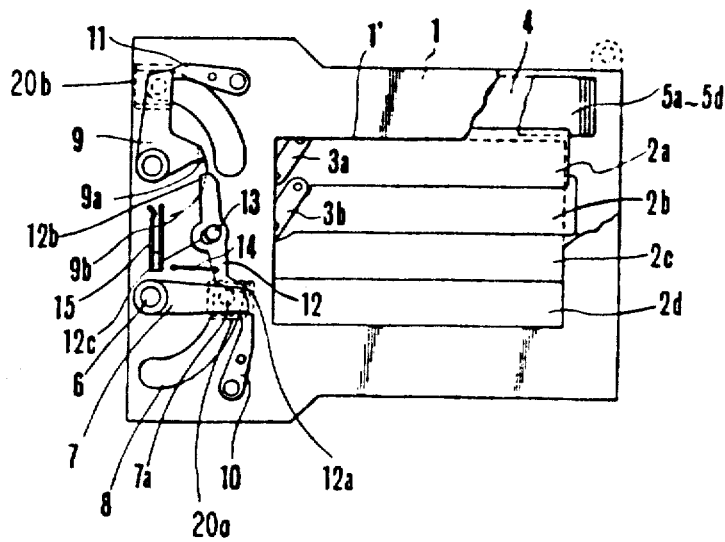

UNITED STATES PATENT AND TRADEMARK OFFICE
CERTIFICATE OF CORRECTION

PATENT NO. : 4,378,150

DATED : March 29, 1983

INVENTOR(S) : Teiji Hashimoto et al

Page 3 of 4

It is certified that error appears in the above-identified patent and that said Letters Patent is hereby corrected as shown below:

FIG.1

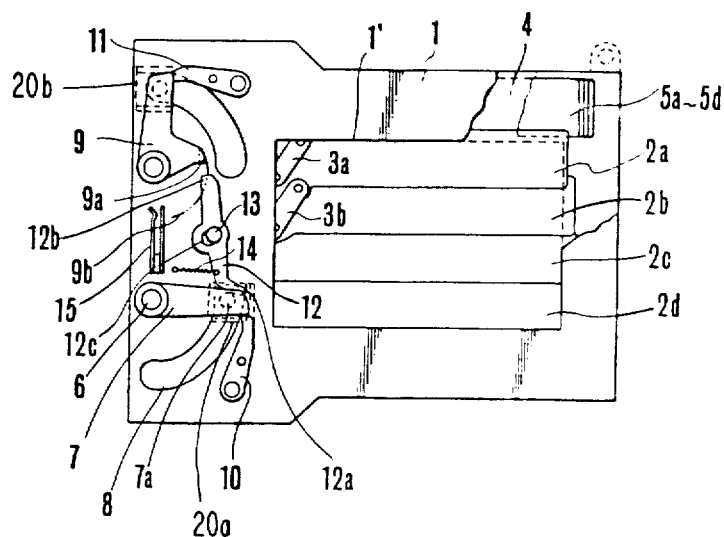

UNITED STATES PATENT AND TRADEMARK OFFICE
CERTIFICATE OF CORRECTION

PATENT NO. : 4,378,150

DATED : March 29, 1983

INVENTOR(S) : Teiji Hashimoto et al

It is certified that error appears in the above-identified patent and that said Letters Patent is hereby corrected as shown below:

FIG.2